Aug. 8, 1950      I. VINOKOR      2,518,205
SIEVE OR GRID FOR KITCHEN SINKS
Filed Dec. 13, 1945
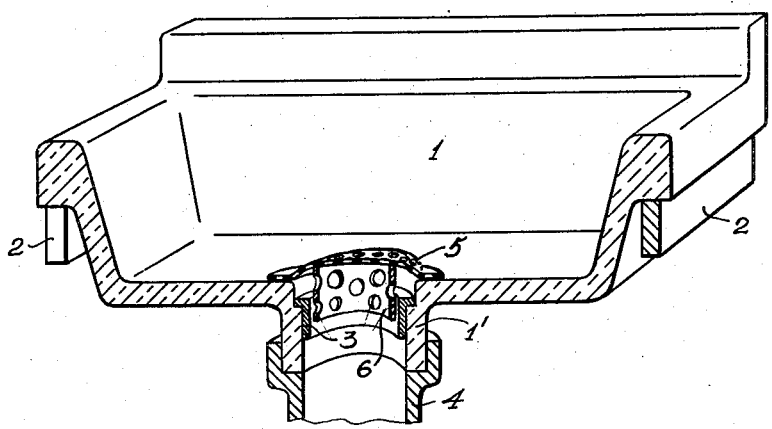
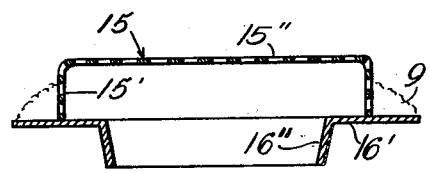
Isaac Vinokor
by Desso Steinherz
Attorney.

Patented Aug. 8, 1950

2,518,205

UNITED STATES PATENT OFFICE 2,518,205

SIEVE OR GRID FOR KITCHEN SINKS

Isaac Vinokor, Haifa, Palestine

Application December 13, 1945, Serial No. 634,705
In Palestine January 20, 1945

1 Claim. (Cl. 4—292)

1

Kitchen sewage contains fatty, filthy and solid matter likely to choke the drain pipes. It is therefore common practice to place into the outlet of the kitchen sink a removable sieve or grid for interception of the said filthy and solid matter. These known grids consist of a flanged cup, the flange of which can rest on the bottom of the sink, while the cylindrical part of the cup, the bottom of which is provided with a great number of perforations, fits into the opening in the bottom of the sink which leads to the drain pipe, thus being prevented from lateral displacement. The objectionable matter of the sewage subsides in the cup forming the grid from which it cannot be easily removed. It is, therefore, frequently allowed to accumulate in the cup, where it hinders the free flow of the sewage. While the free flow is retarded, the level of the filthy water in the sink rises, the filth and fat deposit on the walls of the sink and on any crockery etc. in the sink.

The object of the present invention is to provide a sieve or grid for kitchen sinks or the like, from which the subsiding matter can be easily removed and the perforations of which cannot so easily become clogged and which thus assures an uninterrupted drain of the kitchen sewage. According to the invention the new sieve is constituted by a perforated plate, preferably an upwardly dished perforated plate or an inverted perforated cup to the inner side of which is fixed a cylindrical rim or ring. The edge of the cup is destined to rest on the bottom of the sink, while the ring enters into the outlet of the sink in order to prevent the lateral displacement of the sieve. The sieve thus lies on or above the bottom of the sink and any solid matter flowing along the bottom towards the outlet of the sink, is retained on the top of the sieve from which it can be easily removed. In a modification of the invention the device comprises a plane ring, a perforated cup on one side, and a rim on the other side of the ring.

The invention is shown in the annexed drawing by way of example.

Fig. 1 shows in a perspective vertical sectional view a kitchen sink with a new sieve in its outlet.

Fig. 2 shows a vertical section of the sieve on a larger scale.

Fig. 3 is a like section of a modified construction.

Adverting to Fig. 1 the numeral 1 designates a kitchen sink of common construction, usually of china or clay. It is supported by two arms 2 fixed in the wall of the kitchen. Into its outlet

2 is fitted a metallic socket 3 adapted to receive a stopper. The outlet spout 1' leads into the drain pipe 4. The grid according to Figs. 1 and 2 comprises a dished metallic plate 5 provided with a great number of perforations and a cylindrical rim 6 fixed to the inner side of the dished plate. The latter reposes with its margin on the bottom of the sink, while the rim 6 enters into the socket 3. The rim 6 may likewise be perforated.

The sieve or grid according to Fig. 3 comprises an inverted cup 15 formed by a cylindrical wall 15' and a top 15''. Both these parts are provided with a great number of perforations. Cylindrical wall 15' is soldered to a plane flange 16' of a cylindrical or conical ring 16''. The flange 16' is intended to rest on the bottom of the sink, while the ring 16'' is adapted to enter into the outlet of the sink.

The top 15'' of the new sieve or grid when in position of use, lies above the bottom of the sink to a height equal to the height of wall 15'. So long as the level of the filthy water does not reach the top 15'' of the grid, the water will drain off through the perforations of the cylindrical wall 15'. When the level rises, the water will flow out also through the perforated top 15''. But the heavier solid parts of the sewage subsiding on the bottom of the sink will move towards wall 15' and will accumulate on the projection of flange 16', as indicated at 9, so that the perforations of the top will remain free for the passage of the water.

From the above description it will be apparent, that the new grid assures an uninterrupted and quick drainage of the filthy water from the sink and is apt to remove the inconveniences caused by the otherwise stagnant kitchen sewage.

Some changes may be made without departing from the scope of the invention. So for instance the cup and the flanged ring may be made of a single piece of sheet metal or plastic, or the rim 6 may be substituted by one strip or two crossing metallic strips fixed in a plane or planes substantially vertically to the perforated plate.

What I claim is:

Grid for the outlet of kitchen sinks, comprising a perforated plate which is dished in its central part, and flat in its circumferential part, and perforated tubular means connected to the hollow side of the plate to be introduced in the outlet of the sinks to prevent lateral dislocation of the grid.

ISAAC VINOKOR.

(References on following page)

REFERENCES CITED

The following references are of record in the file of this patent:

UNITED STATES PATENTS

| Number | Name | Date |
|---|---|---|
| 97,219 | Nott | Nov. 23, 1869 |
| 738,726 | Lytle | Sept. 8, 1903 |
| 826,505 | Henzel | July 17, 1906 |
| 960,901 | Hall | June 7, 1910 |
| 1,144,704 | Graham | June 29, 1915 |
| 1,150,231 | Smith | Aug. 17, 1915 |
| 1,440,543 | Katzinger | Jan. 2, 1923 |
| 1,454,346 | Stoll | May 8, 1923 |
| 1,494,882 | Barger | May 20, 1924 |
| 1,596,893 | Schifter | Aug. 24, 1926 |